United States Patent [19]

Duel et al.

[11] Patent Number: 4,559,708

[45] Date of Patent: Dec. 24, 1985

[54] METHOD AND APPARATUS FOR THE MEASUREMENT OF THE INTERNAL CIRCUMFERENCE OF COMPLIANT RINGS

[75] Inventors: Don M. Duel, Phoenix; Fred J. Smith, Mesa, both, Ariz.

[73] Assignee: Motorola, Inc., Schaumburg, Ill.

[21] Appl. No.: 402,512

[22] Filed: Jul. 28, 1982

[51] Int. Cl.$^4$ ............................................. G01B 5/00
[52] U.S. Cl. ..................................... 33/178 R; 33/1 N
[58] Field of Search ............... 33/1 N, 178 R, 178 E, 33/174 TD, 174 TA, 174 TC, 174 Q, DIG. 17, 542, 534, 549

[56] References Cited

U.S. PATENT DOCUMENTS

| | | | |
|---|---|---|---|
| 1,828,414 | 10/1931 | Illingworth et al. | 33/19 B |
| 2,079,323 | 5/1937 | Kokotiak | 33/174 TP |
| 2,438,813 | 3/1948 | Lundeen | 33/19 B |
| 2,677,315 | 5/1954 | Hansen | 33/19 B X |
| 2,879,605 | 3/1959 | McLaughlin | 33/178 R |
| 3,086,409 | 4/1963 | Budney et al. | 33/174 TC X |
| 3,958,335 | 5/1976 | Arnold | 33/174 TD X |

FOREIGN PATENT DOCUMENTS

| | | | |
|---|---|---|---|
| 0761835 | 9/1980 | U.S.S.R. | 33/178 B |
| 0913025 | 3/1982 | U.S.S.R. | 33/178 B |

*Primary Examiner*—Harry N. Haroian
*Attorney, Agent, or Firm*—Raymond J. Warren

[57] ABSTRACT

A method and apparatus for measuring the internal circumference of a marked compliant ring using a cylinder of known circumference having a fiducial mark aligned with a pointer on a device for measuring an angle of rotation to which the cylinder is affixed. Rotation of the cylinder until the mark on the compliant ring is realigned with the pointer determines an angle of rotation from which can be calculated the internal circumference of the compliant ring relative to the circumference of the cylinder.

7 Claims, 2 Drawing Figures

METHOD AND APPARATUS FOR THE MEASUREMENT OF THE INTERNAL CIRCUMFERENCE OF COMPLIANT RINGS

BACKGROUND OF THE INVENTION

The present invention pertains in general to methods and apparatus for the measurement of internal circumferences and in particular to methods and apparatus for measurement of the internal circumference of compliant rings.

Compliant rings, such as O-rings and circular cross section belts, are commonly molded out of a compliant material, often out of rubber. A particularly vexing problem arises from the fact that minor variations in the composition of the molded material can lead to varying amounts of post-molding shrinkage. Therefore, no matter how accurately the size of the mold is made it is necessary to measure samples of molded rings in order to determine whether the size of the ring falls within required tolerances.

Tolerances are particularly narrow for compliant rings which are used as sealing rings which are compressed within relatively narrow grooves about the circumference of containers in order to provide a liquid- or gas-tight seal. Tolerances for such rings commonly fall within the range of ±0.020 inches of circumference or less. Exceeding these tolerances may lead to rings which do not properly fit and which therefore may give rise to poor seals.

One approach to compliant ring measurement is to cut the ring and measure the length of the resulting linear configuration. However, deforming the ring in this way leads to stretching of the material along the original inner edge and compression of the outer edge which results in an inaccurate measurement of the length.

Another approach to measurement of compliant rings involves dropping the ring on a cone which is marked along its height to indicate its circumference. The accuracy of this method of measurement is limited by the ability of the operator to align the ring on the cone; by the ability of the operator to interpolate small distances between marks on the cone; and by variations in frictional forces between the cone and ring resulting in stretching of the ring.

Yet another approach involves drawing two concentric circles on transulucent paper corresponding to the ideal inner and outer circumferences of the ring and attempting to align the ring between the circles. Again the ability to align the ring between the circles and the ability to judge the degree of fit limit this approach.

All of the above approaches are slow, inaccurate, provide less than adequate support of and lead to elastic distortion of the rings being measured. Furthermore, the repeatability of measurements, especially important for large lot sampling, is limited.

SUMMARY OF THE INVENTION

Accordingly it is an object of the present invention to provide a new and improved apparatus for measurement of the internal circumference of compliant rings.

It is a further object of the present invention to provide a new and improved method for measuring the internal circumference of a compliant ring.

Among the advantages of the present invention are the provision of maximum support for and consistent minimum elastic distortion of the compliant ring being measured.

A further advantage of the present invention is the high degree of accuracy of measurement attainable.

Yet another advantage of the present invention is the ability to measure the internal circumference of compliant rings very quickly without sacrificing accuracy.

These and other objects and advantages of the present invention will become apparent to those skilled in the art upon consideration of the accompanying specification, claims and drawings.

In order to attain the above mentioned and other objects and advantages the method of the present invention involves measuring the internal circumference of a compliant ring using a device for measuring an angle of rotation having a portion suitable for the attachment of a work piece. The method of the present invention comprises the step of affixing a cylinder having a known circumference less than the internal circumference of the compliant ring to the portion suitable for attachment of a work piece of the device for measuring an angle of rotation. The method of the present invention further comprises marking the compliant ring at a point on its circumference, draping the compliant ring around said cylinder so that said mark is at a known position, rotating said cylinder through an angle until said mark on the compliant ring returns to said known position, and using said angle to calculate the internal circumference of the compliant ring.

The apparatus according to the present invention involves an apparatus for measuring the internal circumference of a compliant ring and comprises a device for measuring an angle of rotation having a portion suitable for attachment of a work piece and a cylinder having a known circumference less than the internal circumference of the compliant ring and being affixed to the portion suitable for attachment of a work piece.

DESCRIPTION OF A PREFERRED EMBODIMENT

Figure 1:
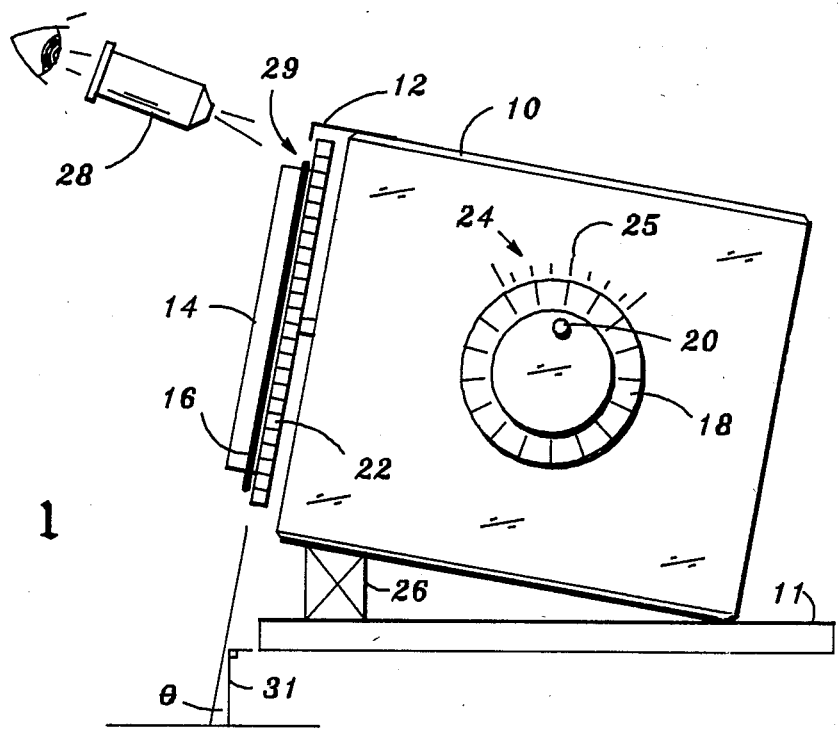
FIG. 1 is a left side elevational view of a preferred embodiment of the present invention.

In a preferred embodiment of the apparatus for measuring the internal circumference of a compliant ring according to the present invention as illustrated in FIG. 1 a device for measuring an angle of device 10 is placed on a work bench 11. A pointer 2 is affixed to device 10 in order to indicate the rotational displacement of portion 22 of device 10 which portion is suitable for the attachment of a work piece. Affixed to portion 22 is a cylinder 14 having a known circumference. A compliant ring 16 is shown draped around cylinder 14 in preparation for measurement.

A rotating dial 18 has a handle 20. A vernier scale 24 having an indicating line 25 is disposed near one edge of dial 18. A block 26 is placed beneath a first end of device 10 nearest portion 22. The placement of block 26 beneath the first end of device 10 causes a diameter 30 of device 14 to be canted from a line 31 normal to surface 11. Optical equipment 28 is directed at a marked point 29 on compliant ring 16.

Figure 2:
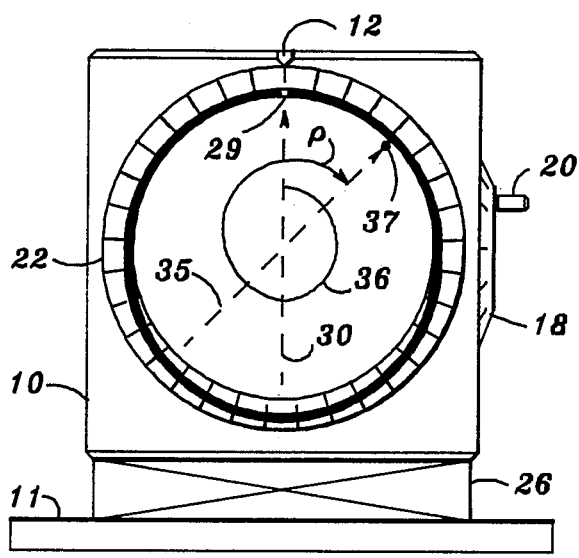
FIG. 2 is a front elevational view of an apparatus embodying the present invention.

Turning now to the frontal view of the structures of FIG. 1 as shown in FIG. 2 in which the structure shown in FIG. 1 are indicated by the same numbers. In addition to the structures of FIG. 1, FIG. 2 shows a second diameter 35 of cylinder 14 and a spiral 36 indicative of an angle of rotation p through which cylinder 14 must be turned between one alignment of mark 29 with pointer 12 and the next.

Device 10 may be an indexing head, also called a dividing head, which is a piece of inspection equipment commonly found in quality control areas which measures angles of rotation. A dividing head model RSI-10, sold by Nikken Kosakusho Works, Japan, may be used as the rotation measuring device. Pointer 12 may be a piece of metal cut specially for the purpose and affixed to an indexing head, or may be a height gauge applied to the point on ring 16 furthest from surface 11. Height gauges are well known and readily available to those skilled in the art and will not be discussed further. Cylinder 14 may be a turned block of aluminum that has been measured using a micrometer in order to determine its diameter and thus its circumference. Block 26 may be any block of material suitable for canting device 10; and cylinder 14 as parts of device 10. Optics 28 may be any sort of magnifying optics useful for determining the alignment of mark 29 with pointer 12 and mark 37 on cylinder 14. Ring 16 may be any ring which will drape around cylinder 14, frictionally engage with it and track smoothly on it.

As is clear to one skilled in the art, opticss need not be used where the accuracy achieved by the unaided eye is sufficient for the application. Likewise, device 10 need only be canted where ring 16 does not track evenly without canting.

According to the method of the present invention, cylinder 14 is affixed to portion 22 of device 10. Compliant ring 16 is marked at point 29 and drapped about cylinder 14. Next mark 29 and mark 37, on cylinder 14, are aligned with pointer 12, which may easily be accomplished if mark 37 is made so that it aligns with pointer 12 in the zero position of device 10.

Portion 22 is rotated by turning handle 20 until point 29 is again aligned with pointer 12. By using block 26 to cant device 10, ring 16 can be conveniently made to follow the circumference of cylinder 14, however the use of block 26 is not necessary if device 10 is well leveled. Because ring 16 is frictionally engaged with cylinder 14 ring 16 will follow the circumference of cylinder 14 point for point. Because the internal circumference of ring 16 is larger than the circumference of cylinder 14, greater than one turn of cylinder 14 will be required to align mark 29 with pointer 12. The internal circumference, IC, of ring 16 may then be determined relative to the circumference, K, of cylinder 14 and the angle of rotation in degrees, p, by the use of the following equation:

$$IC = Kp/360°$$

Dial 18 is commonly marked with degree notations and by use of the vernier scale 24, the degree notations provided on scale 18 and originally zeroed with mark 25, may be used to determine minutes and fractions of minutes. In this way a repeatable measurement of the internal circumference of a compliant ring is obtained to several decimal places.

While the present invention has been described in terms of a preferred embodiment, further modifications and improvements will occur to those skilled in the art. For example, other rotational measuring devices perhaps having digital readouts, may be employed to avoid the use of optics 28, vernier scale 24, and the markings on dial 18. Also it is obvious that the ring could be turned through more than one cycle of alignment and the resulting angle divided by the number of cycles to improve accuracy. Likewise, any orientation of a device for measuring an angle of rotation which provides frictional engagement between the circumference of cylinder 14 and the inner circumference of ring 16 is understood by one skilled in the art to be interchangeable with the frictional force described herein.

We desire it to be understood therefore, that this invention is not limited to the particular form shown and we intend in the appended claims to cover all such equivalent variations which come within the scope of the invention as described.

We claim:

1. An apparatus for measuring the internal circumference of a compliant ring comprising:
    a compliant ring having an internal circumference:
    a rotatable cylinder having a known circumference less than said internal circumference of said compliant ring such that as said rotatable cylinder is rotated said internal circumference of said compliant ring will follow the circumference of said rotatable cylinder causing said compliant ring to rotate; and
    measuring means for measuring an angle of rotation of said rotatable cylinder, said measuring means having a portion suitable for attachment of said rotatable cylinder.

2. The apparatus for measuring the internal circumference of a compliant ring according to claim 1 wherein said measuring means for measuring an angle of rotation is an indexing head.

3. The apparatus for measuring the internal circumference of a compliant ring according to claim 2 wherein said rotatable cylinder further comprising a marked location for engagement with a compliant ring and said indexing head further comprising a pointer copable of being aligned with said location.

4. The apparatus for measuring an internal circumference of a compliant ring according to claim 3 further comprising magnifying optical equipment useful for aligning said location on said rotatable cylinder.

5. The apparatus for measuring an internal circumference of a compliant ring according to claim 1 wherein said rotatable cylinder is canted.

6. A method for measuring the interal circumference of a compliant ring marked at a point on its circumference using a device for measuring an angle of rotation having a portion suitable for attachment of a work piece, the portion being affixed to a cylinder having a known circumference less than the internal circumference of the compliant ring, comprising the steps of:
    placing the compliant ring around said cylinder so that the mark is at a known position and so that the ring is engaged with the circumference of the cylinder;
    rotating said cylinder through an angle until the mark on the compliant ring returns to said known position; and
    using said angle to calculate the internal circumference of the compliant ring.

7. The method for measuring the internal circumference of a compliant ring according to claim 6 wherein said using step comprises the step of calculating the internal circumference of the compliant ring by employing the equation $$IC = Kp/360°$$

where IC is internal circumference of the compliant ring, K is the known circumference of the cylinder and p is said angle in degrees.

* * * * *